United States Patent [19]

Molina

[11] Patent Number: 4,606,193

[45] Date of Patent: Aug. 19, 1986

[54] FREEWHEEL FLYWHEEL TRANSMISSION SYSTEM

[76] Inventor: Antonio F. Molina, 3674 SW. 25th St., Miami, Fla. 33133

[21] Appl. No.: 567,615

[22] Filed: Jan. 3, 1984

Related U.S. Application Data

[63] Continuation-in-part of Ser. No. 502,564, Jun. 9, 1983.

[51] Int. Cl.⁴ .............................................. F02B 73/00
[52] U.S. Cl. ....................................... 60/698; 74/572; 310/74
[58] Field of Search ................. 60/698, 716, 718, 720; 74/572; 290/1 R; 310/74

[56] References Cited

U.S. PATENT DOCUMENTS

| | | | |
|---|---|---|---|
| 3,970,917 | 7/1976 | Diggs | 74/572 X |
| 4,035,659 | 7/1977 | Jeppson | 310/74 X |
| 4,159,427 | 6/1979 | Wiedemann | 60/698 X |

Primary Examiner—Stephen F. Husar
Attorney, Agent, or Firm—John P. White

[57] ABSTRACT

A freewheel flywheel transmission system capable of utilizing the kinetic rotational energy of one or more flywheels for subsequent conversion to electrical power, which includes a frame, a shaft rotatively supported by the frame, and one or more flywheels mounted on the shaft. The transmission system is provided with a first transmission means for providing rotational movement to the shaft in response to power transmitted from a power source, a second transmission means for providing rotational movement to the one or more flywheels in response to the rotational movement of the shaft, and a drive means for transmitting rotational movement from the one or more flywheels to a means for converting rotational movement to electrical power.

11 Claims, 8 Drawing Figures

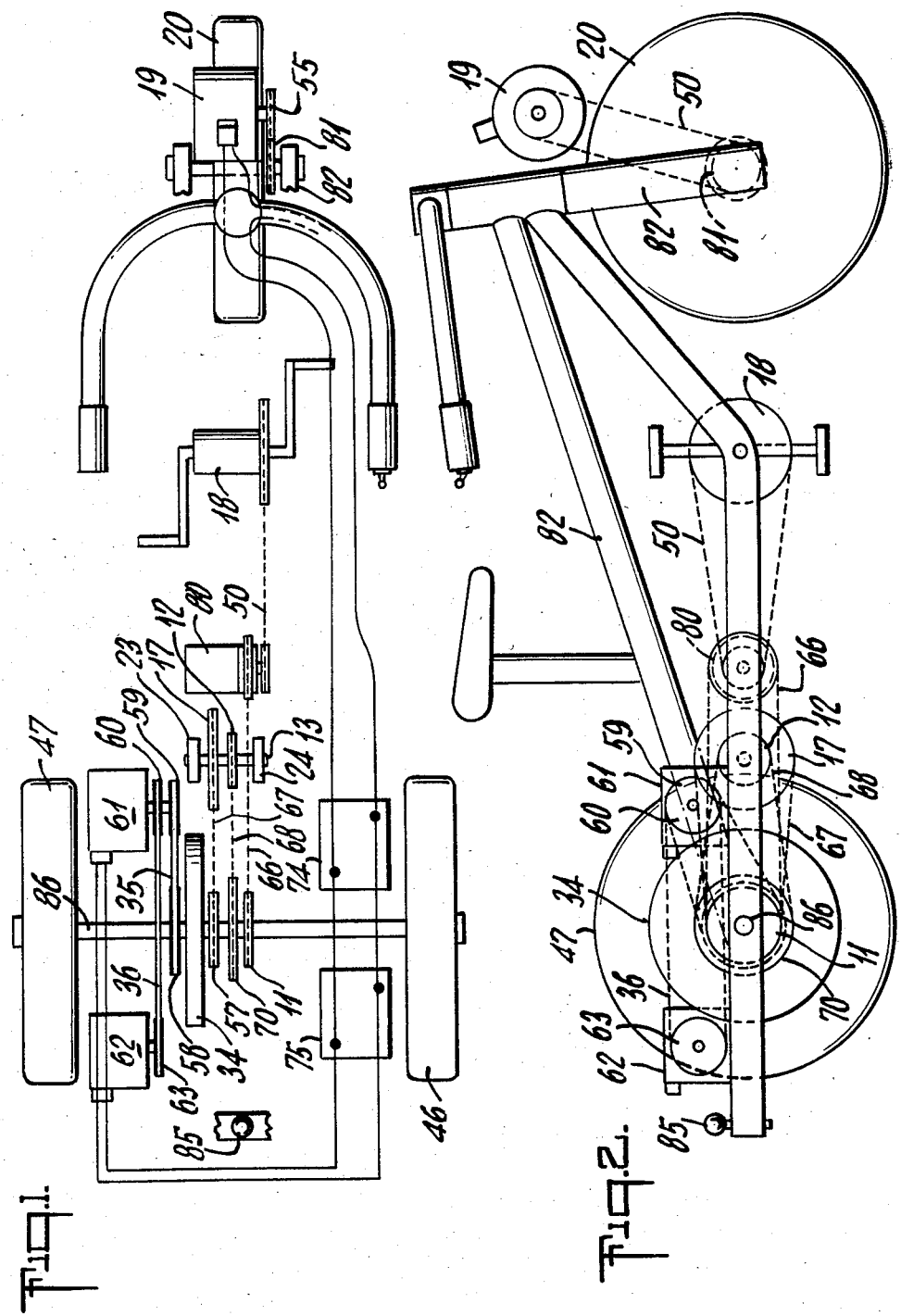

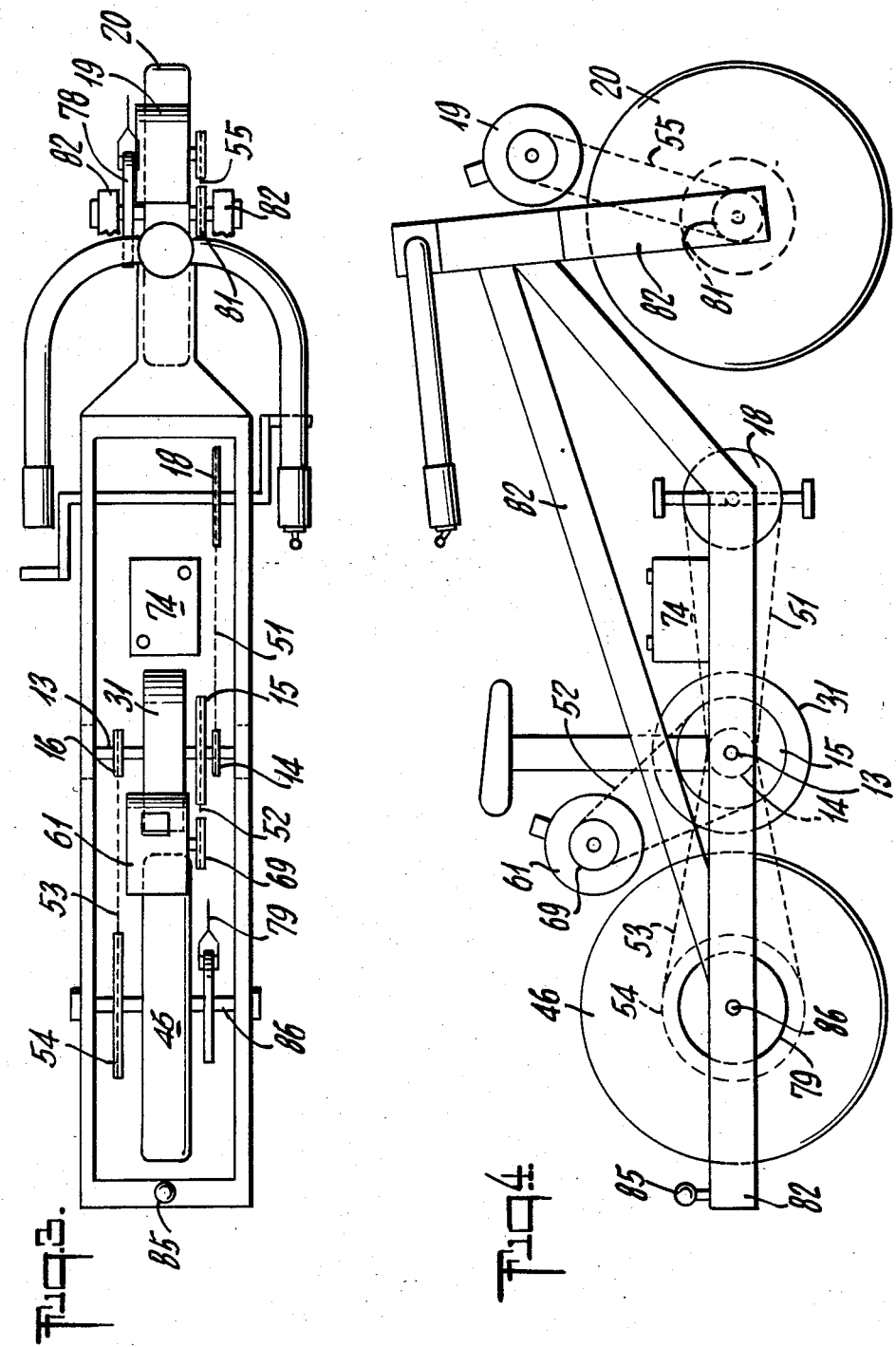

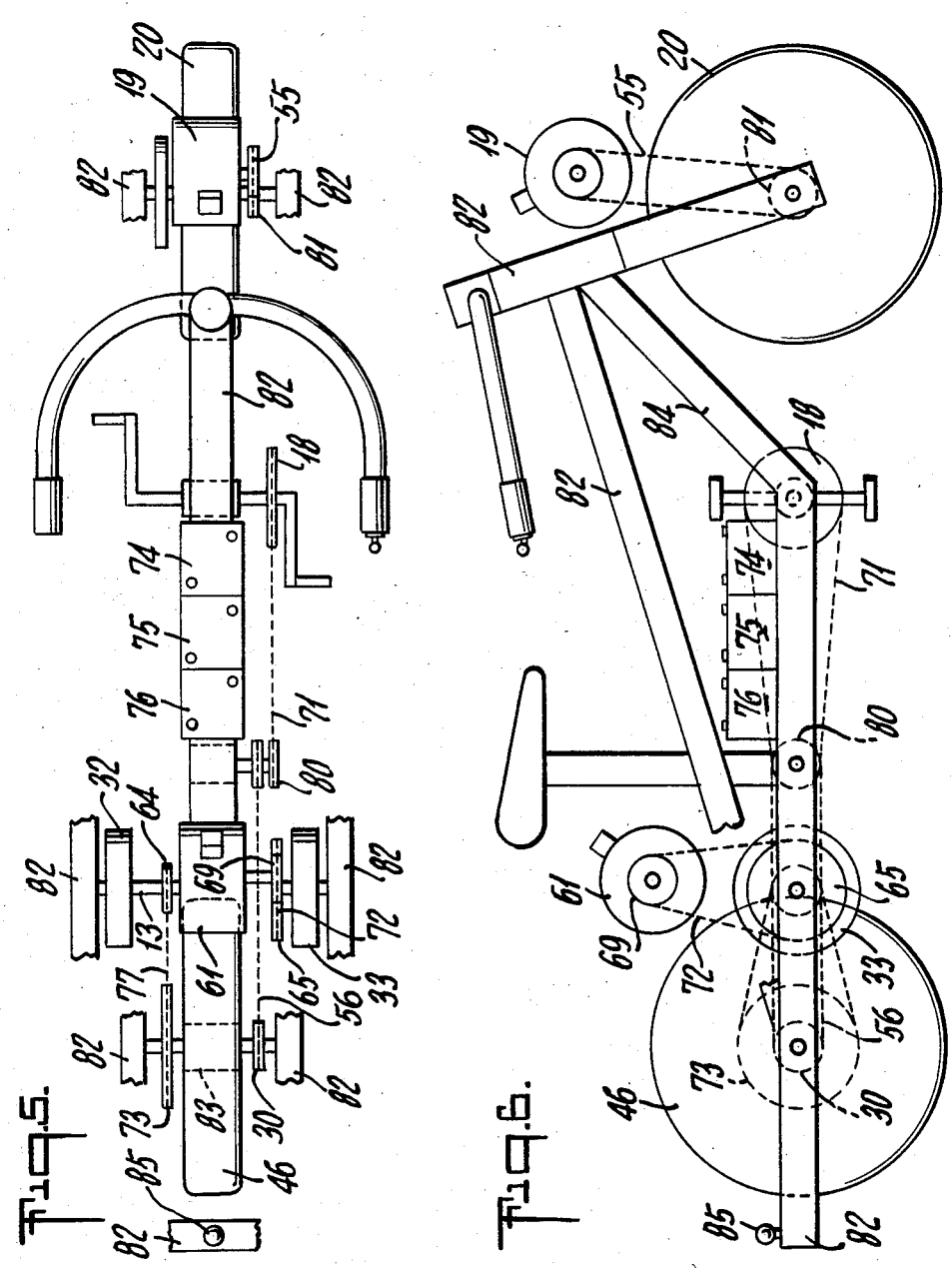

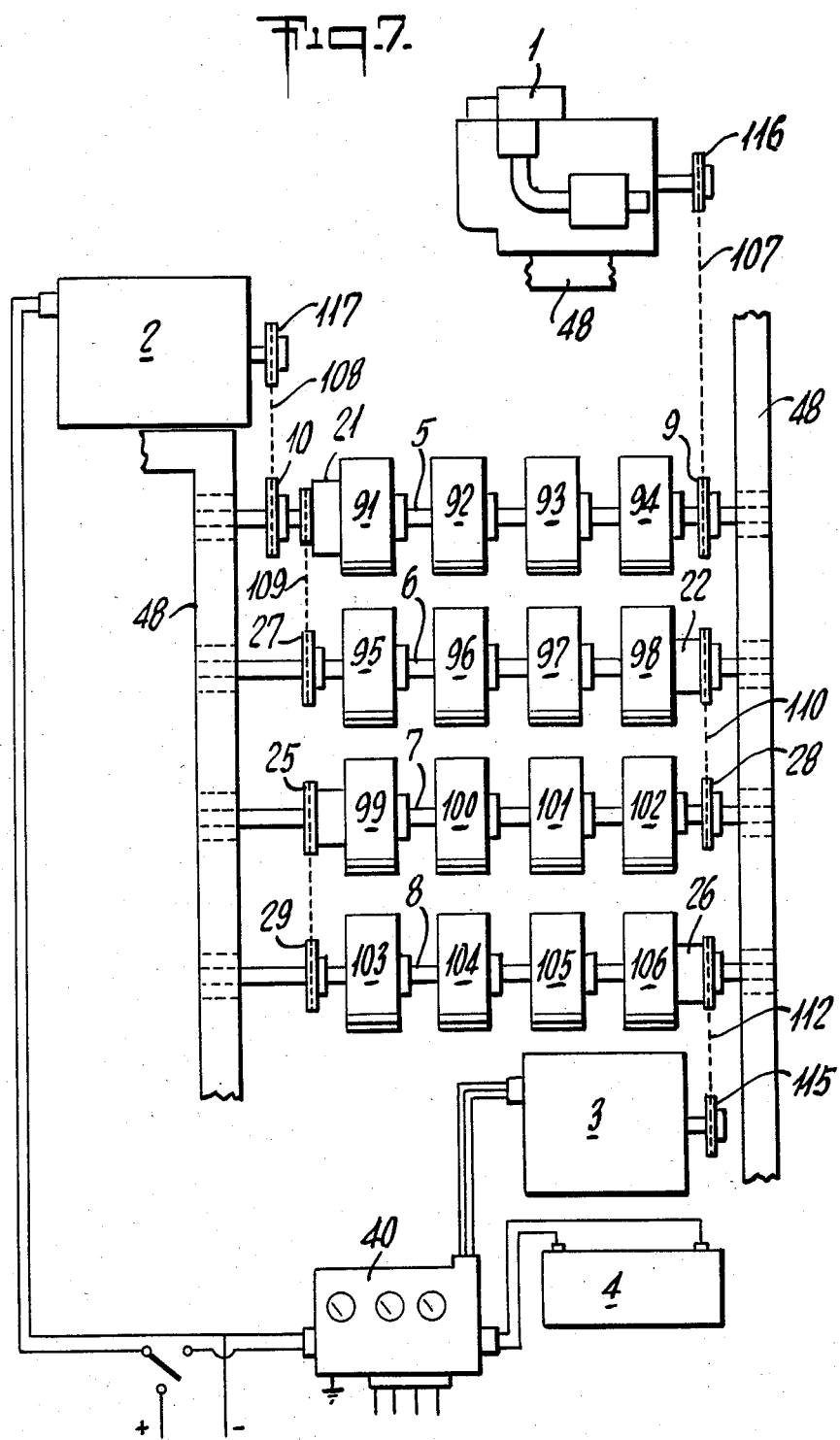

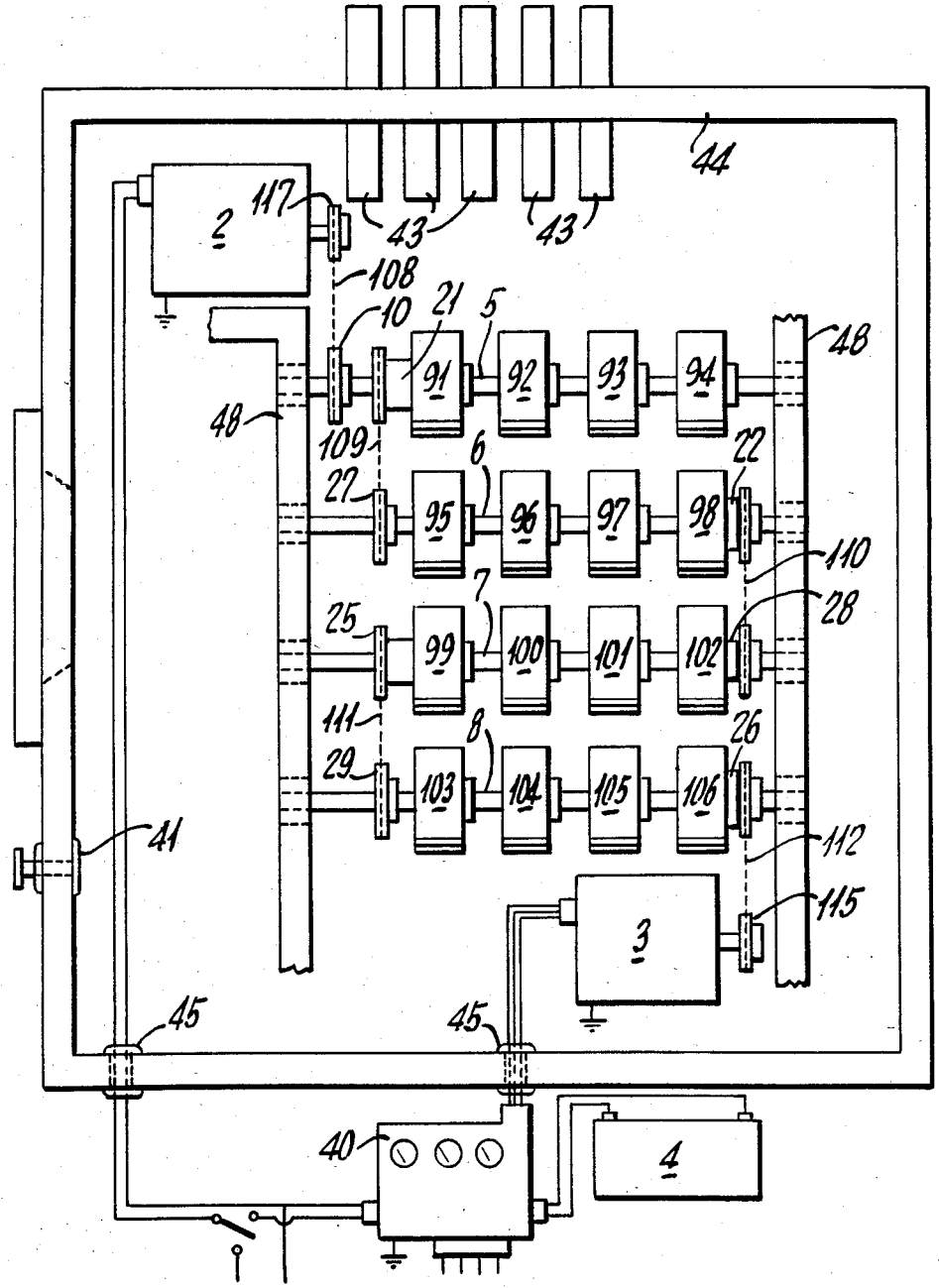

FREEWHEEL FLYWHEEL TRANSMISSION SYSTEM

BACKGROUND OF THE INVENTION

This is a continuation-in-part application of my pending application, Ser. No. 502,564 filed on June 9, 1983, the disclosure of which is incorporated by reference herein.

This invention relates to transmission systems for vehicles and machinery, and to power plants which include a freewheel flywheel transmission system. More particularly, this invention relates to a freewheel flywheel transmission system which includes one or more flywheels and sprockets or gears, or both, for increasing power and performance while conserving energy, particularly by the transmission of the kinetic rotational energy of the rotating flywheels and of a moving vehicle's inertia power.

The use of a freewheel flywheel in a transmission system to store and later release kinetic rotational energy to a wheel of a vehicle is known in the art; see, for example, my earlier patent, U.S. Pat. No. 4,343,569, issued Oct. 12, 1982. In the earlier system, the kinetic rotation inertia power of a freewheel flywheel could be stored, and later released as rotational power or movement, by engaging with a clutch means the freewheel flywheel with a sprocket. However, heavy vehicles and equipment require more kinetic rotational energy from the freewheel flywheel transmission than lighter vehicles such as bicycles. Such earlier systems are thus impractical for heavy vehicles and machinery since the flywheel would necessarliy be of unacceptably great dimensions and size. Additionally, the earlier system required the actioning of various clutch assemblies to engage the rotating freewheel flywheel with a sprocket for transmitting rotational movement or power to a wheel of the vehicle. Finally, in the earlier system, the freewheel flywheel does not utilize, via the flywheel of the freewheel flywheel transmission system, the vehicle's own inertia power.

SUMMARY OF THE INVENTION

A freewheel flywheel transmission system, which includes a frame, a shaft rotatively supported by the frame, one or more flywheels mounted on the shaft, a first transmission means for providing rotational movement to the shaft in response to power transmitted from a power source, a second transmission means for providing rotational movement to the one or more flywheels in response to the rotational movement of the shaft, and a drive means for transmitting rotational movement from the one or more flywheels to a means for converting rotational movement to electrical power.

The shaft may be a first shaft and is an axle of a wheeled vehicle. The one or more flywheels are mounted on the axle and are freewheel flywheels. The second transmission means comprises a first sprocket means mounted on the axle such that rotation of the axle effects a corresponding and simultaneous rotation of the first sprocket. A second shaft is rotatively supported by the frame and is a freewheeling shaft. Rotatively mounted on the second shaft is a freewheel coupled to the first sprocket means by a transmission chain so that rotation of the first sprocket means effects a corresponding and simultaneous rotation of the freewheel and initiates rotation of the second shaft. A second sprocket means, also mounted on the second shaft such that rotation of the second shaft effects a corresponding and simultaneous rotation of the second sprocket means, is coupled by a transmission chain to a third sprocket means which is affixed to the hub of a first freewheel flywheel of the one or more flywheels. The third sprocket means may be a freewheel sprocket rotatively mounted on the axle and affixed to the first freewheel flywheel, or it may be a sprocket which is affixed to the first freewheel flywheel and which has a circular bore having a greater circumference than the circumference of the axle such that the axle passes through the bore of the third sprocket but is not in contact with the third sprocket. Desirably, the drive means comprises a first pulley affixed to the hub of the first freewheel flywheel, a second pulley mounted on the means for converting rotational movement to electrical power, and a transmission belt coupling the first and second pulleys. Desirably, the means for converting rotational movement to electrical power includes a first and a second alternator, and the drive means includes a first pulley affixed to the hub of the first flywheel, a second and a third pulley mounted on the first alternator, a fourth pulley mounted on the second alternator, a first transmission belt coupling the first and second pulleys and a second transmission belt coupling the third and fourth pulleys.

In another embodiment, the first transmission means includes an axle of the wheeled vehicle, a first sprocket means mounted on the axle such that rotation of the axle effects a corresponding and simultaneous rotation of the first sprocket means, a freewheel mounted on the shaft which is a freewheeling shaft, and a transmission chain coupling the first sprocket means and the freewheel such that rotation of the first sprocket effects a corresponding and simultaneous rotation of the freewheel and initiates rotation of the shaft. The second transmission means comprises rigidly affixing the one or more flywheels to the freewheeling shaft. Desirably, where only one flywheel is included, the drive means includes a second sprocket means affixed to a first flywheel of the one or more flywheels, a third sprocket means rotatively mounted on the means for converting rotational movement to electrical power, and a transmission chain coupling the second and third sprocket means. Desirably, where two or more flywheels are included, the drive means includes a second sprocket means mounted on the shaft such that rotation of the shaft effects a corresponding and simultaneous rotation of the second sprocket means, a third sprocket means mounted on the means for converting rotational movement to electrical power, and a transmission chain coupling the second and third sprocket means.

Another embodiment of a freewheel flywheel transmission system includes a frame, a plurality of shafts rotatively supported by the frame, a plurality of flywheels mounted on each shaft, a plurality of transmission means for providing rotational movement, in response to power transmitted from a power source, in succession to a first shaft through a last shaft of the plurality of shafts and thereby to the plurality of flywheels mounted on each shaft, and a means for converting the rotational movement of the plurality of shafts and the plurality of flywheels mounted on each shaft to electrical power. The plurality of transmission means may comprise a series of sprockets and transmission chains, or a series of pulleys and transmission belts, coupling in succession the power source to the first shaft and the first shaft through the last shaft. More desirably, the plurality of transmission means, coupling in succession the first through the last shaft, from preceeding to succeeding shaft, each includes a centrifugal clutch means mounted on the preceeding shaft, a sprocket means mounted on the succeeding shaft, and a means for coupling the centrifugal clutch means and the sprocket means such that rotational movement is transmitted from the preceeding shaft to the succeeding shaft when the clutch means is engaged.

A power plant which includes a frame, a power means mounted on the frame for providing rotational movement, a plurality of shafts rotatively supported by the frame, a plurality of flywheels mounted on each shaft, a means for converting rotational movement to electrical power mounted on said frame, a plurality of transmission means for transmitting rotational movement when said power means is activated in succession from said power means to a first through a last shaft of said plurality of shafts and thereby to the plurality of flywheels mounted on each shaft of said plurality of shafts, and a drive means connecting said last shaft to the means for converting rotational movement, for transmitting rotational movement from the plurality of shafts and plurality of flywheels mounted on each shaft to the means for converting rotational movement. The power means desirably may be an internal combustion engine, or an electric motor, or both. The plurality of transmission means may comprise a series of sprockets and transmission chains, or a series of pulleys and transmission belts, linking in succession the power source to the first shaft and the first shaft through the last shaft. More desirably, the transmission means linking the power means to the first shaft includes a first sprocket mounted on the power means, a second sprocket mounted on the first shaft, and a transmission chain coupling the first and second sprockets. Also more desirably, the plurality of transmission means coupling in succession the first through the last shaft, from preceeding to succeeding shaft, each includes a centrifugal clutch means mounted on the preceeding shaft, a sprocket means mounted on the succeeding shaft, and a means for coupling the centrifugal clutch means and the sprocket means such that rotational movement is transmitted from the preceeding shaft to the succeeding shaft when the clutch means is engaged. The drive means desirably includes a centrifugal clutch means mounted on the last shaft, a sprocket means mounted on the means for converting rotational movement, and a means for coupling the clutch means to the sprocket means such that rotational movement is transmitted from the last shaft and the plurality of flywheels mounted on the last shaft to the means for converting rotational movement when the clutch means is engaged. Desirably, where the power means is an electric motor, the power plant includes an enclosing vacuum housing.

BRIEF DESCRIPTION OF THE DRAWINGS

FIG. 1 is a top view of a wheeled vehicle including one embodiment of a freewheel flywheel transmission system showing one flywheel mounted on a rear axle of the vehicle. Also mounted on the rear axle are a pulley, affixed to the left side hub of the flywheel and coupled by a transmission belt to a second pulley affixed to an alternator, a third sprocket affixed to the right side hub of the flywheel and coupled by a transmission chain to a second sprocket mounted on a freewheeling shaft which is rotatively supported by the vehicle frame, and a first sprocket mounted to the right of the third sprocket and coupled by a transmission chain to a freewheel mounted on the freewheeling shaft. Also mounted on the rear axle to the right of the first sprocket is a fourth sprocket which is coupled by a transmission chain to a coaster brake which is in turn linked by a transmission chain to a set of pedals.

FIG. 2 is a side view of the vehicle of FIG. 1.

FIG. 3 is a top view of a wheeled vehicle including another embodiment of a freewheel flywheel transmission system according to this invention, showing one flywheel mounted on a freewheeling shaft rotatively supported by the vehicle frame. Mounted on the rear axle of the vehicle is a first sprocket, which is coupled to a freewheel mounted on the freewheeling shaft. Also mounted on the shaft is a second sprocket which is affixed to the right side hub of the flywheel and coupled by a transmission chain to an alternator.

FIG. 4 is a side view of the vehicle of FIG. 3.

FIG. 5 is a top view of a wheeled vehicle including another embodiment of a freewheel flywheel transmission system according to this invention, showing two flywheels mounted on a freewheeling shaft rotatively supported by the vehicle frame. Mounted on the rear axle of the vehicle is a first sprocket which is coupled to a freewheel mounted on the freewheeling shaft. Also mounted on the shaft is a second sprocket which is coupled by a transmission chain to a third sprocket mounted on an alternator.

FIG. 6 is a side view of the vehicle of FIG. 5.

FIG. 7 is a top view of a power plant for a vehicle or for machinery according to this invention incorporating another embodiment of a freewheel flywheel transmission system, and showing an internal combustion engine, an electric motor, a series of shafts rotatively supported by the frame of the power plant and a plurality of flywheels mounted on each of the shafts. The internal combustion engine and the electric motor are each coupled to the first shaft of the plurality of shafts by, respectively, a sprocket mounted on the engine or motor, a transmission chain, and a freewheel sprocket mounted on the first shaft. The shafts are coupled in succession from preceeding to succeeding shaft, beginning with the first shaft, by a centrifugal clutch mounted on the preceeding shaft, a sprocket mounted on the succeeding shaft, and a transmission chain coupling the centrifugal clutch and the sprocket. The last shaft is coupled to an alternator by a centrifugal clutch mounted on the last shaft, a transmission chain, and a sprocket mounted on the alternator.

FIG. 8 is a top view of a vacuum power plant according to this invention, incorporating another embodiment of a freewheel flywheel transmission system, and showing an electric motor, a series of shafts rotatively supported by the frame of the power plant and a plurality of flywheels mounted on each of the shafts. The electric motor is coupled to the first shaft of the plurality of shafts by a sprocket mounted on the motor, a transmission chain, and a freewheel sprocket mounted on the shaft. The shafts are coupled in succession from preceeding to succeeding shaft, beginning with the first shaft, by a centrifugal clutch mounted on the preceeding shaft, a sprocket mounted on the succeeding shaft, and a transmission chain coupling the centrifugal clutch and the sprocket. The last shaft is coupled to an alternator by a centrifugal clutch mounted on the last shaft, a transmission chain, and a sprocket mounted on the alternator. The power plant is enclosed in a vacuum housing, which housing is shown provided with wiring outlets, heat fins, a vacuum valve and a vacuum chamber access plate.

DETAILED DESCRIPTION OF THE INVENTION

A freewheel flywheel transmission system, which includes a frame, a shaft rotatively supported by the frame, one or more flywheels mounted on the shaft, a first transmission means for providing rotational movement to the shaft in response to power transmitted from a power source, a second transmission means for providing rotational movement to the one or more flywheels in response to the rotational movement of the shaft, and a drive means for transmitting rotational movement from the one or more freewheel flywheels to a means for converting rotational movement to electrical power. The frame desirably may be a portion of the vehicle frame, as for example, a bicycle frame. Rotation of the one or more flywheels is initiated by the rotation of the shaft when power from a power source is transmitted to the means for rotating the shaft. A wheeled vehicle which includes this freewheel flywheel transmission system may conveniently be provided with a trailer hitch for connection to a power train trailer.

In one embodiment, the shaft is a first shaft and is an axle of a wheeled vehicle. The flywheels in this embodiment are freewheel flywheels, such that they are freewheeling on the axle. The second transmission means comprises a first sprocket means mounted on the axle such that rotation of the axle effects a corresponding and simultaneous rotation of the first sprocket. A second shaft is rotatively supported by the frame, preferably on ball bearings, and is thus a freewheeling shaft.

Rotatively mounted on the second shaft is a freewheel, which is coupled to the first sprocket means by a transmission chain, so that rotation of the first sprocket means effects a corresponding and simultaneous rotation of said freewheel and initiates rotation of the second shaft. A second sprocket means, also mounted on the second shaft such that rotation of the second shaft effects a corresponding and simultaneous rotation of the second sprocket means, is coupled by a transmission chain to a third sprocket means which is affixed to the hub of a first freewheel flywheel of the one or more flywheels. The third sprocket means may be a freewheel sprocket rotatively mounted on the axle, or it may be a sprocket which is rigidly affixed to the first freewheel flywheel and which has a circular bore having a greater circumference than the circumference of the axle such that the axle passes through the bore of the third sprocket but is not in contact with the third sprocket. It will be appreciated that the third sprocket means conveniently may be of a variety of shapes and sizes and may be conveniently affixed to the first freewheel flywheel in a variety of ways. Desirably, the drive means comprises a first pulley affixed to the hub of said first freewheel flywheel such that rotation of the first freewheel flywheel effects a corresponding and simultaneous rotation of the first pulley, a second pulley mounted on the means for converting rotational movement to electrical power, and a transmission belt coupling the first and second pulleys. The freewheel flywheel transmission system may include a means for converting rotational movement to electrical power, which desirably may be an alternator. More desirably, the means for converting rotational movement to electrical power includes a first and a second alternator, and the drive means includes a first pulley affixed to the hub of the first flywheel such that rotation of the flywheel effects a corresponding and simultaneous rotation of the first pulley, a second and a third pulley mounted on the first alternator, such that rotation of the second pulley effects a corresponding and simultaneous rotation of the third pulley, a fourth pulley mounted on the second alternator, a first transmission belt coupling the first and second pulleys such that rotation of the first pulley effects a corresponding and simultaneous rotation of the second pulley, and a second transmission belt coupling the third and fourth pulleys, such that rotation of the third pulley effects a corresponding and simultaneous rotation of the fourth pulley. It will be appreciated that the flywheels may be of varied shapes, sizes and weights convenient, for example, to the needs of the user, the size and configuration of the vehicle and the desired electrical power. The configuration of this embodiment allows for a shorter vehicle length since the flywheel is mounted on an axle of the vehicle, rather than on a separate shaft. Also, since the weight of the flywheel is on the axle, a more evenly spread vehicle load is achieved.

In another embodiment, the first transmission means includes an axle of the wheeled vehicle, a first sprocket means mounted on the axle such that rotation of the axle effects a corresponding and simultaneous rotation of the first sprocket means, a freewheel mounted on the shaft which is a freewheeling shaft, and a transmission chain coupling the first sprocket means and the freewheel such that rotation of the first sprocket effects a corresponding and simultaneous rotation of the freewheel and initiates rotation of the shaft. The second transmission means comprises rigidly affixing the one or more flywheels to the freewheeling shaft; the one or more flywheels thus operate as freewheel flywheels due to the freewheeling action of the freewheel shaft. Desirably, where only one flywheel is included, the drive means includes a second sprocket means affixed to a first flywheel of the one or more flywheels, such that rotation of the first flywheel effects a corresponding and simultaneous rotation of the second sprocket means, a third sprocket means rotatively mounted on the means for converting rotational movement to electrical power, and a transmission chain coupling the second and third sprocket means. Desirably, where two or more flywheels are included, the drive means includes a second sprocket means mounted on the shaft such that rotation of the shaft effects a corresponding and simultaneous rotation of the second sprocket means, a third sprocket means mounted on the means for converting rotational movement to electrical power, and a transmission chain coupling the second and third sprocket means.

Another embodiment of a freewheel flywheel transmission system includes a frame, a plurality of shafts rotatively supported by the frame, a plurality of flywheels mounted on each shaft, a plurality of transmission means for providing rotational movement, in response to power transmitted from a power source, in succession to a first shaft through a last shaft of the plurality of shafts and thereby to the plurality of flywheels mounted on each shaft, and a means for converting the rotational movement of the plurality of shafts and the plurality of flywheels mounted on each shaft to electrical power. It will be appreciated that the flywheels may be of any desired size, weight and shape.

The plurality of transmission means may comprise a series of sprockets and transmission chains, or a series of pulleys and transmission belts, coupling in succession the power source to the first shaft and the first shaft through the last shaft. More desirably, the plurality of transmission means coupling in succession the first through the last shaft, from preceeding to succeeding shaft, each includes a centrifugal clutch means mounted on the preceeding shaft, a sprocket means mounted on the succeeding shaft, and a means for coupling the centrifugal clutch means and the sprocket means such that rotational movement is transmitted from the preceeding shaft to the succeeding shaft when the clutch means is engaged.

A power plant which includes a frame, a power means mounted on the frame for providing rotational movement, a plurality of shafts rotatively supported by the frame, a plurality of flywheels mounted on each shaft, a means for converting rotational movement to electrical power mounted on said frame, a plurality of transmission means for transmitting rotational movement when said power means is activated in succession from said power means to a first through a last shaft of said plurality of shafts and thereby to the plurality of flywheels mounted on each shaft of said plurality of shafts, and a drive means connecting said last shaft to the means for converting rotational movement, for transmitting rotational movement from the plurality of shafts and plurality of flywheels mounted on each shaft to the means for converting rotational movement. The power means desirably may be an internal combustion engine, or an electric motor, or both. The plurality of transmission means may comprise a series of sprockets and transmission chains, or a series of pulleys and transmission belts, linking in succession the power source to the first shaft and the first shaft through the last shaft. More desirably, the transmission means linking the power means to the first shaft includes a sprocket mounted on the power means, a freewheel mounted on the first shaft, and a transmission chain coupling the sprocket and the freewheel. Also more desirably, the plurality of transmission means coupling in succession the first through the last shaft, from preceeding to succeeding shaft, each includes a centrifugal clutch means mounted on the preceeding shaft, a sprocket means mounted on the succeeding shaft, and a means for coupling the centrifugal clutch means and the sprocket means such that rotational movement is transmitted from the preceeding shaft to the succeeding shaft when the clutch means is engaged. The drive means desirably includes a centrifugal clutch means mounted on the last shaft, a sprocket means mounted on the means for converting rotational movement, and a means for coupling the clutch means to the sprocket means such that rotational movement is transmitted from the last shaft and the plurality of flywheels mounted on the last shaft to the means for converting rotational movement when the clutch means is engaged. In this power plant, the kinetic rotational energy of all of the flywheels, that is, the plurality of flywheels mounted on each of the shafts of the plurality of shafts, is transmitted to the means for converting rotational movement or power to electrical power. The conversion means may be, for example, a generator; desirably it is an alternator. Desirably, where the power means is an electric motor, the power plant includes an enclosing vacuum housing. The vacuum housing may conveniently be provided with heat dissipation fins, an access cover, electrical wiring outlets, a vacuum valve, and the like. The power plant conveniently may be provided with or connected to storage batteries.

FIGS. 1 and 2 illustrate a wheeled vehicle including one embodiment of a freewheel flywheel transmission system according to this invention, comprised of a freewheel flywheel 34 rotatively mounted on axle 86, with sprocket 57 affixed to the right side of freewheel flywheel 34, and pulley 58 affixed to the left side of freewheel flywheel 34, such that rotation of freewheel flywheel 34 effects a corresponding and simultaneous rotation of sprocket 57 and pulley 58. Axle 86 is rotatively supported by the vehicle frame 82. Mounted on axle 86 are sprocket 70 and sprocket 11. Sprocket 70 is coupled by transmission chain 68 to freewheel 12 mounted on freewheeling shaft 13. Shaft 13 is rotatively supported by pillowblocks 23 and 24 affixed to the vehicle frame. Sprocket 11 is coupled by transmission chain 66 to coaster brake 80, which is in turn coupled by transmission chain 50 to pedal assembly 18. Mounted on freewheeling shaft 13 is sprocket 17 which is coupled by transmission chain 67 to sprocket 57 affixed to freewheel flywheel 34. Pulley 58 is linked by transmission belt 35 to pulley 59 mounted on alternator 61. Also mounted on alternator 61 is pulley 60 linked by transmission belt 36 to pulley 63 mounted on alternator 62. In the embodiment of FIGS. 1 and 2, the wheeled vehicle is provided with electric motor 19 affixed to the front of vehicle frame 82. Electric motor 19 is coupled by transmission chain 55 to coaster brake 81. Driven wheel 20 is mounted on coaster brake 81. The vehicle is further provided with tractive wheel 46, and wheel 47 which freewheels on axle 86, both mounted on rear axle 86, and electric batteries 74 and 75 mounted on vehicle frame 82 and connected by an appropriate electric circuit to alternators 61 and 62 and electric motor 19, so that the batteries receive electrical power from the alternators and provides electrical power to the electric motor. When electric motor 19 is turned on, rotational movement is transmitted through transmission chain 55 to coaster brake 81 and thereby to driven wheel 20, moving the vehicle forward and thereby providing rotational movement to tractive wheel 46, wheel 47 and axle 86. Axle 86 in turn rotates sprocket 70 which through transmission chain 68 rotates freewheel 12 thereby rotating shaft 13, also freewheeling on pillowblocks 23 and 24, and sprocket 17. Sprocket 17 in turn through transmission chain 67 rotates sprocket 57, and thereby, freewheel flywheel 34 and affixed pulley 58. It will be appreciated that freewheel flywheel 34 is now freewheeling on rotating axle 86. The rotational power applied to freewheel flywheel 34 and the kinetic rotational inertia power of freewheel flywheel 34 are transmitted via affixed pulley 58, transmission belt 35, and pulley 59 to alternator 61, and further via pulley 60, transmission belt 36 and pulley 63 to alternator 62. In this way, batteries 74 and 75 are recharged to some extent by the vehicle inertia power transmitted to freewheel flywheel 34 and the kinetic rotational inertia power of rotating freewheel flywheel 34. It will be appreciated that additional flywheels may be provided to this system. Desirably, alternative or additional rotational power may be provided to this system by a human user operating pedal assembly 18 which, via transmission chain 50, coaster brake 80 and transmission chain 66, rotates sprocket 11 affixed to axle 86 and thereby rotates axle 86 and driven wheels 46 and 47; through the already described process, rotational movement or power is thereby transmitted to freewheel flywheel 34 and ultimately to alternators 61 and 62. The vehicle is shown conveniently provided with trailer-hitch 85 mounted on the rear of vehicle frame 82.

FIGS. 3 and 4 illustrate another wheeled vehicle including another embodiment of a freewheel flywheel transmission system according to this invention comprised of a flywheel 31 mounted on shaft 13, with sprocket 15 affixed to the right side hub of freewheel flywheel 31, such that rotation of flywheel 31 effects a corresponding and simultaneous rotation of sprocket 15. Shaft 13 is rotatively mounted, as for example on bearings (not shown), on the vehicle frame 82. Mounted on rear axle 86 are tractive wheel 46, and on the left side of tractive wheel 46, sprocket 54. Sprocket 54 is coupled by transmission chain 53 to freewheel 16 rotatively mounted on shaft 13 on the left side of flywheel 31. Sprocket 15 is coupled by transmission chain 52 to sprocket 69 mounted on alternator 61 which is mounted on the vehicle frame. In the embodiment of FIGS. 3 and 4, the wheeled vehicle is provided with a power source in the form of an electric motor 19 affixed to the front of vehicle frame 82. Electric motor 19 is coupled by transmission chain 55 to coaster brake 81. Driven wheel 20 is mounted on coaster brake 81. The vehicle is further provided with electric storage battery 74 mounted on vehicle frame 82. Battery 74 is connected by an appropriate electrical circuit to alternator 61 and electric motor 19, so that the battery receives electrical power from the alternator and provides electrical power to the electric motor.

When electric motor 19 is turned on, rotational movement or power is transmitted through transmission chain 55 to coaster brake 81 and thereby to driven wheel 20, moving the vehicle forward and thereby transmitting rotational movement to tractive wheel 46 and rear axle 86. Axle 86 in turn rotates affixed sprocket 54 which through transmission chain 53 rotates freewheel 16 thereby rotating shaft 13, flywheel 31 mounted on shaft 13, and sprocket 15 affixed to flywheel 31. It will be appreciated that flywheel 31 is now freewheeling due to the freewheeling action of shaft 13. The rotational power transmitted to freewheel flywheel 31 and the kinetic rotational inertia power of freewheel flywheel 31 are transmitted via affixed sprocket 15, transmission chain 52 and sprocket 69 to alternator 61. In this way, and via an appropriate electrical circuit connecting alternator 61 and battery 74, battery 74 is recharged to some extent by the vehicle inertia power transmitted to freewheel flywheel 31 and the kinetic rotational inertia power of rotating freewheel flywheel 31. Desirably, alternative or additional rotational power may be provided to this system by a human user operating pedal assembly 18, which via transmission chain 51, rotates freewheel 14 affixed to shaft 13; through the already described process, rotational movement or power is thereby transmitted to flywheel 31 and ultimately to alternator 61.

FIGS. 5 and 6 illustrate another wheeled vehicle including another embodiment of a freewheel flywheel transmission system according to this invention, and includes flywheels 32 and 33 mounted on shaft 13, said shaft 13 being rotatively mounted on the vehicle frame 82, and thus freewheeling. Mounted on rear axle 83 are tractive wheel 46, and on the left side of tractive wheel 46, affixed sprocket 73. Sprocket 73 is coupled by transmission chain 77 to freewheel 64 rotatively mounted on shaft 13. A sprocket 65, also mounted on shaft 13, is coupled by transmission chain 72 to sprocket 69 mounted on alternator 61 which is mounted on the vehicle frame 82. In the embodiment of FIGS. 5 and 6, the wheeled vehicle is provided with a power source in the form of electric motor 19 affixed to the front of vehicle frame 82. Electric motor 19 is coupled by transmission chain 55 to coaster brake 81. Driven wheel 20 is mounted on coaster brake 81. The vehicle as shown in FIGS. 5 and 6 is further provided with electric storage batteries 74, 75 and 76 mounted on vehicle frame 82. Batteries 74, 75 and 76 are connected by an appropriate electrical circuit to alternator 61 and electric motor 19, so that the batteries receive electrical power from the alternator and provide electrical power to the electric motor.

When electric motor 19 is turned on, rotational movement or power is transmitted through transmission chain 55 to coaster brake 81 and thereby to driven wheel 20, moving the vehicle forward and thereby transmitting rotational movement to tractive wheel 46 and rear axle 83. Axle 83 in turn rotates affixed sprocket 73 which via transmission chain 77 rotates freewheel 64 thereby rotating shaft 13, flywheels 32 and 33 and sprocket 65 all mounted on shaft 13. It will be appreciated that flywheels 32 and 33 are now freewheeling due to the freewheeling action of shaft 13. The rotational movement or power transmitted to flywheels 32 and 33 and the kinetic rotational inertia power of flywheels 32 and 33 are transmitted via affixed sprocket 65, transmission chain 72 and sprocket 69 to alternator 61. In this way, and via an appropriate electrical circuit connecting alternator 61 and batteries 74, 75 and 76, said batteries are recharged to some extent by the vehicle inertia power transmitted to freewheel flywheels 32 and 33 and the kinetic rotational inertia power of rotating freewheel flywheels 32 and 33. Desirably, alternative or additional rotational power may be provided to this system by a human user operating pedal assembly 18, which via transmission chain 71, coaster brake 80 and transmission chain 56, rotates sprocket 30 affixed to rear axle 83 and thereby rotates tractive wheel 46; through the already described sequence, rotational movement or power is thereby transmitted to flywheels 32 and 33 and ultimately to alternator 61.

FIG. 7 illustrates a power plant, including another embodiment of a freewheel flywheel transmission system, according to this invention. A plurality of freewheeling shafts 5, 6, 7 and 8 are rotatively supported by a frame 48. Mounted on shaft 5 are a plurality of flywheels 91, 92, 93 and 94 and freewheels 9 and 10. Mounted on shaft 6 are a plurality of flywheels 95, 96, 97 and 98 and sprocket 27. Mounted on shaft 7 are a plurality of flywheels 99, 100, 101 and 102 and sprocket 28. Mounted on shaft 8 are a plurality of flywheels 103, 104, 105 and 106 and sprocket 29. Internal combustion engine 1, mounted on frame 48, provides rotational movement or power via transmission chain 107 to rotate freewheel 9, thereby rotating shaft 5 on which freewheel 9 is mounted. Electric motor 2, mounted on frame 48, provides rotational movement or power via transmission chain 108 to freewheel 10, and thereby to shaft 5 on which freewheel 10 is mounted, Both power sources, internal combustion engine 1 and electric motor 2, independently may rotate shaft 5, and consequently flywheels 91, 92, 93 and 94 mounted on shaft 5. When either or both power sources are activated rotational movement is transmitted to shaft 5. When rotating shaft 5 and flywheels 91, 92, 93 and 94 mounted on shaft 5 reach a desired number of revolutions per minute, centrifugal clutch 21, mounted on shaft 5, is engaged and provides rotational movement or power via transmission chain 109 to sprocket 27, and thereby to shaft 6 and flywheels 95, 96, 97 and 98. When rotating shaft 6 and flywheels 95, 96, 97 and 98 reach a desired number of revolutions per minute, centrifugal clutch 22, mounted on shaft 6, is engaged and provides rotational movement or power via transmission chain 110 to sprocket 28, and thereby to shaft 7 and flywheels 99, 100, 101 and 102. When rotating shaft 7 and flywheels 99, 100, 101 and 102 reach a desired number of revolutions per minute, centrifugal clutch 25, mounted on shaft 7, is engaged and provides rotational movement or power via transmission chain 111 to sprocket 29, and thereby to shaft 8 and flywheels 103, 104, 105 and 106. When rotating shaft 8 and flywheels 103, 104, 105 and 106 reach a desired number of revolutions per minute, centrifugal clutch 26, mounted on shaft 8, is engaged and provides rotational movement or power via transmission chain 112 to operate alternator 3, mounted on frame 48. It will be appreciated that at this point, all of the flywheels, 91 through 106, are rotating and it will be appreciated that the kinetic rotational power of all of the flywheels is provided to alternator 3. As shown in FIG. 7, alternator 3 is connected, via an appropriate electrical circuit and through distribution panel 40 to electric motor 2 to operate electric motor 2, and to battery 4, mounted on frame 48, for recharging said battery. It will be appreciated that the flywheels may be of a variety of weights, sizes and/or shapes as power needs and vehicle configuration dictate, and to maximize performance and increase output. It will also be appreciated that fewer or more shafts and flywheels may be included in the power plant, as is desirable or convenient.

FIG. 8 illustrates another embodiment of a power plant including a freewheel flywheel transmission system, according to this invention. The embodiment of FIG. 8 represents a modification of the embodiment of FIG. 7. In the embodiment of FIG. 8, rotational movement or power is provided only by electric motor 2. The power plant of FIG. 8 includes a vacuum housing 44 which encloses frame 48, the plurality of shafts 5 through 8, inclusive, and the plurality of flywheels 91 through 106, inclusive, mounted on said plurality of shafts, and alternator 3.

The vacuum housing is provided with heat fins 43, electrical wiring outlets 45, a vacuum valve 41, and a chamber access plate 42. As shown in FIG. 8, alternator 3 is connected via an appropriate electrical wiring circuit to distribution panel 40, which in turn is connected both to battery 4 and electrical motor 2. In FIG. 8, distribution panel 40 and battery 4 are located outside of the vacuum housed power plant.

This power plant, as illustrated in both FIGS. 7 and 8, includes a freewheel flywheel transmission system in which the flywheels in the desired sizes and weights are placed in tandem on freewheeling shafts and these shafts are linked in gang to form a complex assembly designed to increase the power output of any internal combustion engine, electric motor, wind or water power system by adding the kinetic rotational energy of the in-gang system assembly. This power plant, or its included freewheel flywheel transmission system, may be installed as a transmission means between an original power source and the device to which the energy is applied, thereby it will save fuel in some cases while in others it will improve the system efficiency.

This power plant can be used as a stationary one, or can be used in land or water vehicles, e.g. trains, trucks, buses, small, medium or large boats, cargo ships, liners, planes and the like. It will be appreciated that this power plant can increase the power output of wind and water electric power production systems. In a vacuum housing it will increase its action, and it will be of a formidable use in outer space, where it loses weight but the rotational kinetic energy is still present.

When encased in a vacuum housing only an electrical power source to feed the electrical motor is desirably outside of the housing, while inside the housing are: the electric motor, the complex freewheel flywheel transmission system and the alternator. A distribution panel may also be included outside the compartment. The absence of weight in the chamber allows for a higher alternator output for a given power input to the system. The power plant may operate in any grade position, from horizontal to perpendicular, as may be necessary or convenient.

It will be apparent to those skilled in the art that various changes and modifications may be made in the embodiments of this invention hereinabove described without departing from the scope or spirit of this invention. This invention therefore is not to be restricted to the precise details of the structure shown and described, but is defined by the claims which follow hereinafter.

I claim:

1. A freewheel flywheel transmission system comprising:
   a frame;
   a plurality of shafts rotatively supported by said frame;
   a plurality of flywheels mounted on each shaft of said plurality of shafts;
   a power means mounted on said frame for providing rotational movement;
   a plurality of transmission means for transmitting rotational movement when said power means is activated in succession from said power means to a first through a last shaft of said plurality of shafts and thereby to the plurality of flywheels mounted on each shaft of said plurality of shafts; and
   a means for converting the rotational movement of said plurality shafts and said plurality of flywheels mounted on each of said shafts to electrical power.

2. The freewheel flywheel transmission system of claim 1 wherein said means for converting the rotational movement comprises an alternator and a drive means connecting said last shaft to said alternator.

3. A power plant comprising:
   a frame;
   a power means mounted on said frame for providing rotational movement;
   a plurality of shafts rotatively supported by said frame;
   a plurality of flywheels mounted on each shaft of said plurality of shafts;
   a means for converting rotational movement to electrical power mounted on said frame;
   a plurality of transmission means for transmitting rotational movement when said power means is activated in succession from said power means to a first through a last shaft of said plurality of shafts and thereby to the plurality of flywheels mounted on each shaft of said plurality of shafts; and a drive means connecting said last shaft to said means for converting rotational movement for transmitting rotational movement from said plurality of shafts and said plurality of flywheels mounted on each shaft of said plurality of shafts to said means for converting rotational movement.

4. The power plant of claim 3, wherein said power means is an internal combustion engine.

5. The power plant of claim 3, wherein said power means is an electric motor.

6. The power plant of claim 3, wherein said power means comprises an internal combustion engine and an electric motor.

7. The power plant of claim 3, wherein a first transmission means of said plurality of transmission means comprises a sprocket means mounted to said power means, a freewheel mounted on said first shaft, and a means for coupling said sprocket means and said freewheel.

8. The power plant of claim 3, wherein a second transmission means of said plurality of transmission means comprises a centrifugal clutch means mounted on said first shaft of said plurality of shafts, a sprocket means mounted on a second shaft of said plurality of shafts, and a means for coupling said clutch means with said sprocket means such that rotational movement is transmitted from said first shaft and the plurality of flywheels mounted on said first shaft to said second shaft and the plurality of flywheels mounted on said second shaft when said clutch means is engaged.

9. The power plant of claim 1, wherein said drive means comprises a centrifugal clutch means mounted on said last shaft, a sprocket means mounted on said said means for converting rotational movement and a means for coupling said clutch means with said sprocket means such that rotational movement is transmitted from said last shaft and the plurality of flywheels mounted on said last shaft to said means for converting rotational movement when said clutch means is engaged.

10. The power plant of claim 1, wherein said power means is an electric motor and further comprising;
a vacuum housing enclosing said power plant.

11. A power plant comprising;
a frame;
an internal combustion engine for providing rotational movement mounted on said frame;
an electric motor for providing rotational movement mounted on said frame;
a plurality of shafts rotatively supported by said frame;
a plurality of flywheels mounted on each shaft of said plurality of shafts;
an alternator mounted on said frame;
a plurality of transmission means for transmitting rotational movement, a first transmission means of said plurality of transmission means connecting said internal combustion engine to a first shaft of said plurality of shafts for transmitting rotational movement from said engine to said first shaft, a second transmission means connecting said electric motor to said first shaft of said plurality of shafts for transmitting rotational movement from said motor to said first shaft, and the remaining transmission means of said plurality of transmission means connecting in succession said first shaft through a last shaft of said plurality of shafts for transmitting rotational movement in succession from said first shaft through said last shaft;
a drive means connecting said last shaft to said alternator for providing rotational movement to said alternator for operating said alternator; and
a means for distributing electrical power from said alternator.

* * * * *